United States Patent
Armingaud et al.

(10) Patent No.: US 7,865,446 B2
(45) Date of Patent: Jan. 4, 2011

(54) METHOD FOR SECURE ELECTRONIC COMMERCIAL TRANSACTION ON-LINE PROCESSING

(75) Inventors: Francois-Dominique Armingaud, Paris (FR); Fernando Daniel Pedrazzoli Pazos, Madrid (ES)

(73) Assignee: International Businesss Machines Corporation, Armonk, NY (US)

( * ) Notice: Subject to any disclaimer, the term of this patent is extended or adjusted under 35 U.S.C. 154(b) by 909 days.

(21) Appl. No.: 10/315,808

(22) Filed: Dec. 10, 2002

(65) Prior Publication Data

US 2003/0110137 A1    Jun. 12, 2003

(30) Foreign Application Priority Data

Dec. 11, 2001 (EP) .................... 01480126

(51) Int. Cl.
*G06Q 20/00* (2006.01)
(52) U.S. Cl. ......................... 705/64; 705/16
(58) Field of Classification Search ............. 705/64, 705/67, 72–73, 75–79, 16–18, 21, 26, 39, 705/44; 713/182, 184–185
See application file for complete search history.

(56) References Cited

U.S. PATENT DOCUMENTS

| | | | | |
|---|---|---|---|---|
| 5,530,232 A * | 6/1996 | Taylor | .......................... | 235/380 |
| 5,671,279 A * | 9/1997 | Elgamal | ......................... | 705/79 |
| 5,710,889 A * | 1/1998 | Clark et al. | ................... | 235/379 |
| 5,757,917 A * | 5/1998 | Rose et al. | ..................... | 705/79 |
| 5,778,173 A * | 7/1998 | Apte | .............................. | 726/2 |
| 5,796,832 A * | 8/1998 | Kawan | ......................... | 705/65 |
| 5,878,337 A * | 3/1999 | Joao et al. | .................... | 455/406 |
| 5,878,403 A * | 3/1999 | DeFrancesco et al. | ......... | 705/38 |
| 5,903,721 A * | 5/1999 | Sixtus | ............................ | 726/2 |
| 5,910,988 A * | 6/1999 | Ballard | ........................ | 705/75 |
| 5,987,140 A * | 11/1999 | Rowney et al. | ............... | 705/79 |
| 6,003,019 A * | 12/1999 | Eaton et al. | .................... | 705/42 |
| 6,014,636 A * | 1/2000 | Reeder | ......................... | 705/17 |
| 6,014,646 A * | 1/2000 | Vallee et al. | ................... | 705/39 |
| 6,032,135 A * | 2/2000 | Molano et al. | ................ | 705/41 |
| 6,199,165 B1 * | 3/2001 | Grunner | ........................ | 726/3 |
| 6,233,565 B1 * | 5/2001 | Lewis et al. | .................... | 705/35 |
| 6,252,869 B1 * | 6/2001 | Silverman | .................... | 370/352 |
| 6,282,522 B1 * | 8/2001 | Davis et al. | .................... | 705/41 |
| 6,327,578 B1 * | 12/2001 | Linehan | ........................ | 705/65 |
| 6,332,134 B1 * | 12/2001 | Foster | ....................... | 705/36 R |
| 6,394,341 B1 * | 5/2002 | Makipaa et al. | ............. | 235/379 |
| 6,394,343 B1 * | 5/2002 | Berg et al. | ................... | 235/379 |
| 6,477,578 B1 * | 11/2002 | Mhoon | ....................... | 709/229 |
| 6,839,689 B2 * | 1/2005 | Aieta et al. | .................... | 705/51 |
| 6,895,394 B1 * | 5/2005 | Kremer et al. | ................. | 705/67 |
| 7,010,501 B1 * | 3/2006 | Roslak et al. | ................. | 705/26 |
| 7,292,996 B2 * | 11/2007 | Nobrega et al. | ............... | 705/39 |
| 2002/0035538 A1 * | 3/2002 | Moreau | ....................... | 705/39 |
| 2002/0069166 A1 * | 6/2002 | Moreau et al. | ................ | 705/40 |
| 2002/0107791 A1 * | 8/2002 | Nobrega et al. | ............... | 705/39 |
| 2002/0128981 A1 * | 9/2002 | Kawan et al. | ................. | 705/67 |
| 2002/0133467 A1 * | 9/2002 | Hobson et al. | ................ | 705/64 |
| 2003/0149662 A1 * | 8/2003 | Shore | ......................... | 705/39 |
| 2004/0243520 A1 * | 12/2004 | Bishop et al. | ................. | 705/75 |

* cited by examiner

*Primary Examiner*—Evens J Augustin
*Assistant Examiner*—Nancy T Le
(74) *Attorney, Agent, or Firm*—Ronald A. Kaschak; Hoffman Warnick LLC

(57) ABSTRACT

A method for on-line processing of electronic commercial transactions using three distinct communication networks to enhance the security of sensitive information such as credit card numbers.

14 Claims, 10 Drawing Sheets

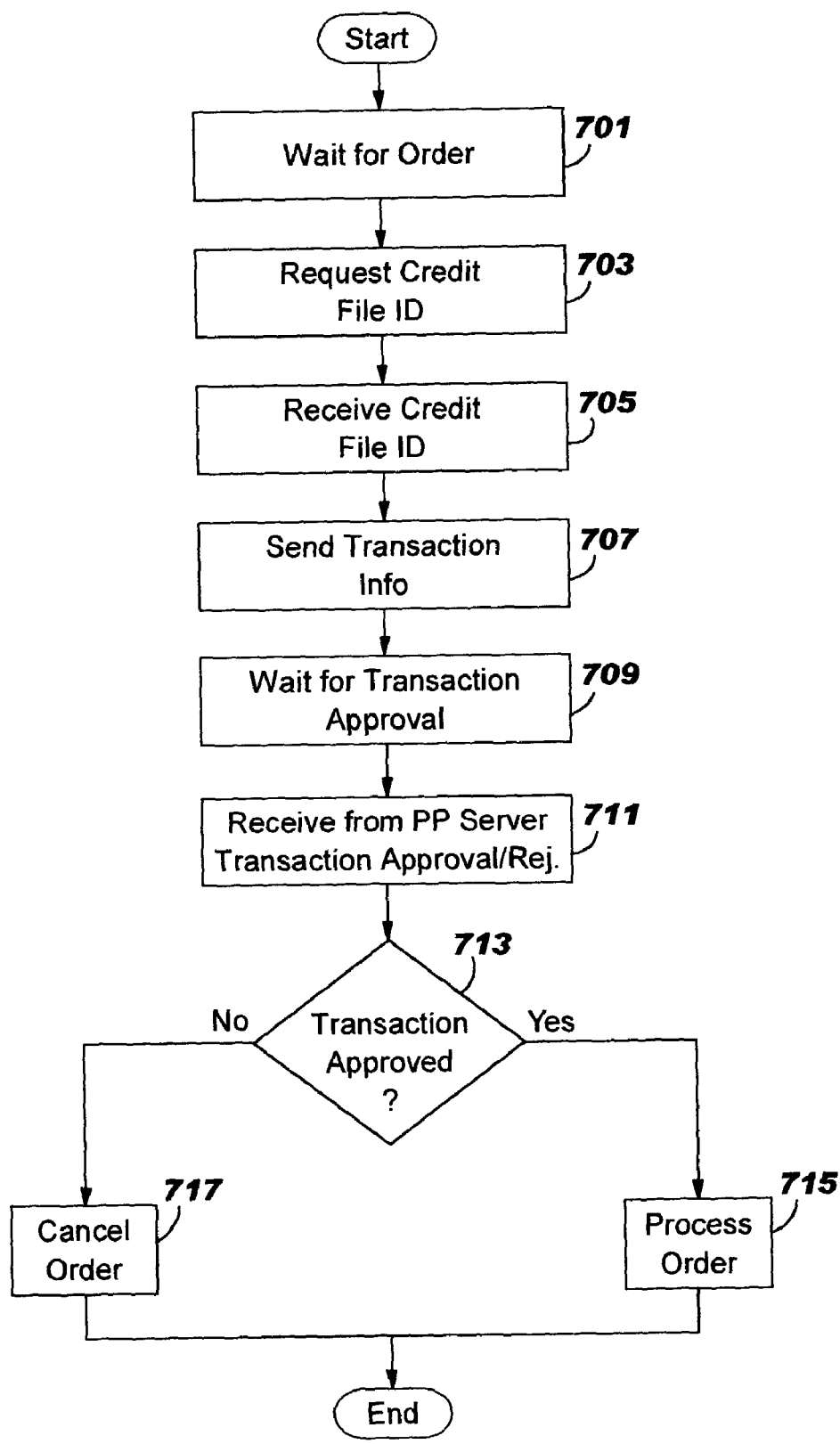

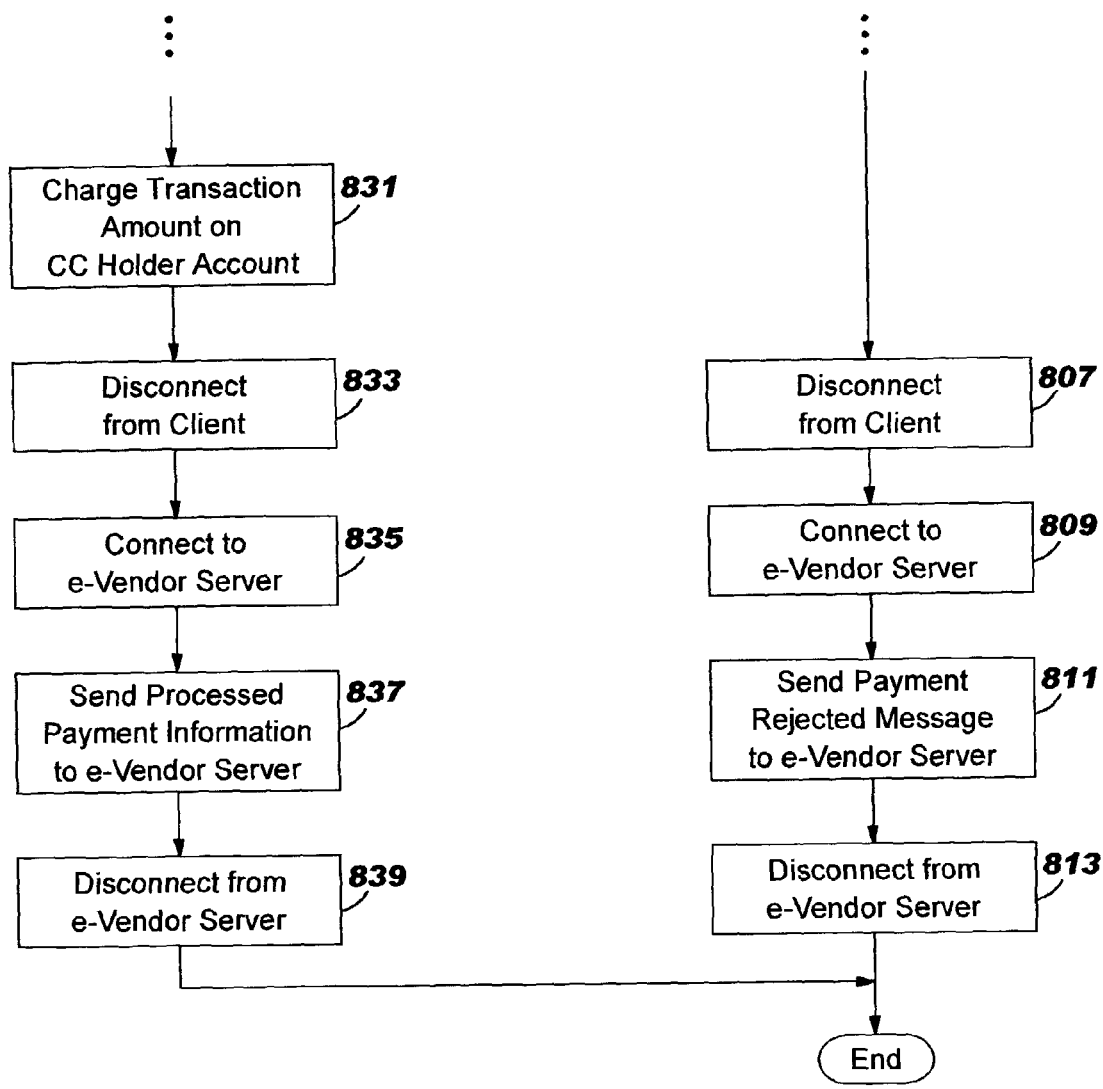

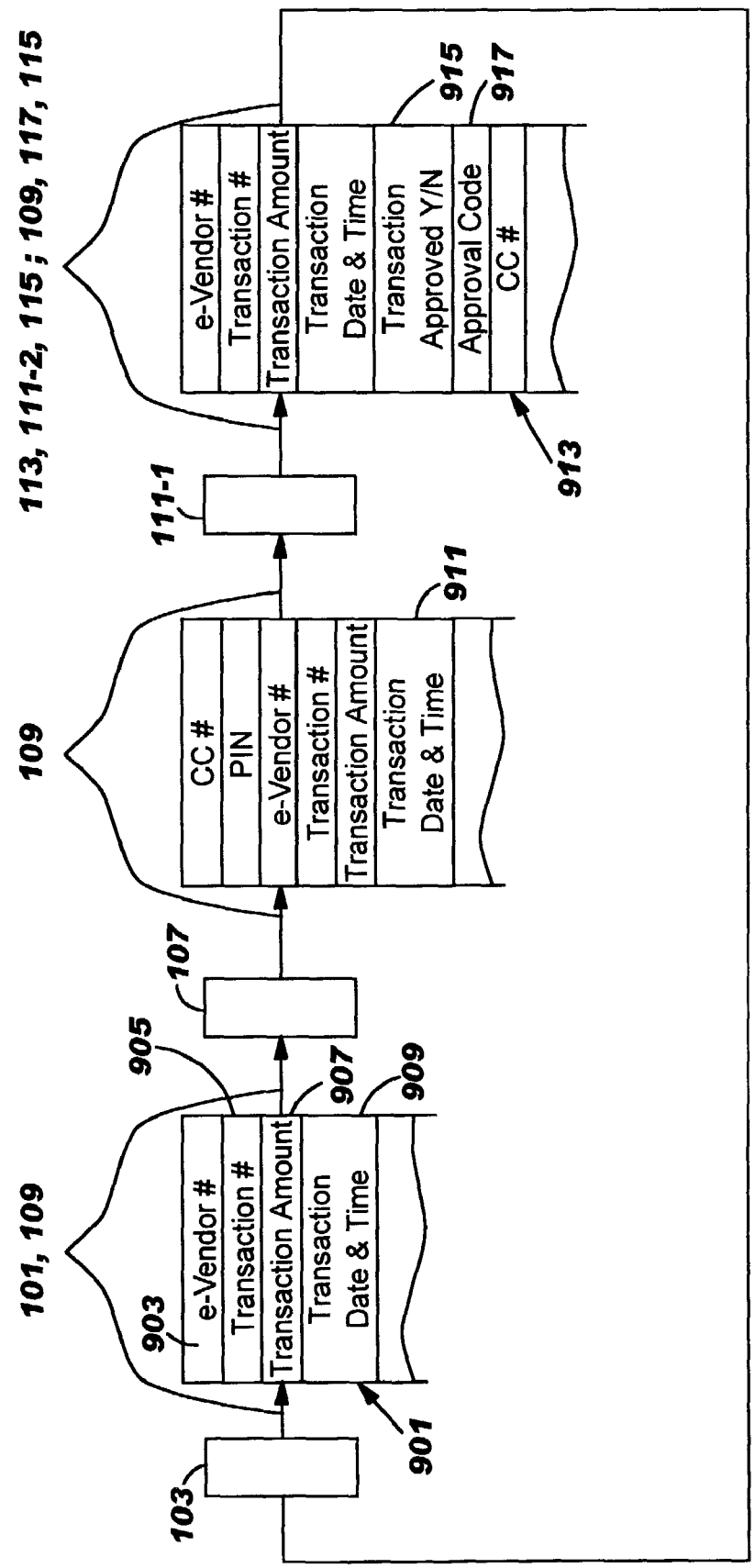

METHOD FOR SECURE ELECTRONIC COMMERCIAL TRANSACTION ON-LINE PROCESSING

TECHNICAL FIELD

The present invention relates generally to the field of secure exchange of information over data communication networks, and particularly to a method for the secure on-line processing (e.g., payment) of electronic commercial transactions.

BACKGROUND

The great popularity achieved by the Internet in the last few years has created a new form of commerce, which goes under the names of electronic commerce (shortly, e-commerce) or virtual shopping. Surfing on the Internet, the public can visit a vast variety of so-called virtual shops, web sites of electronic or virtual vendors offering for sale products and/or services (or even information), compare the products and/or services offered by different virtual vendors and purchase the preferred goods and/or services. All this is available without the burden of materially going shopping.

The most practical way of payment in e-commerce is by credit card: once the purchaser has completed the virtual shopping cart by selecting the desired goods and/or products, he/she transmits to the virtual shop web site the credit card data (typically, the credit card number and expiration date). This method is also preferred by electronic vendors over other payment methods such as checks, and allows completing the transaction in a very short time.

Despite the simplicity of this payment method, the potential risk inherent to transmitting credit card data over the Internet inhibits many people from routinely making electronic purchases. E-commerce is as a matter of fact seen as insecure: due to the open character of the Internet, people worry that sensitive information such as the credit card data could be fraudulently intercepted by someone, and be then fraudulently used without the card holder's consent.

Such a worry is not unjustified: payments by credit card in contexts different from e-commerce rely on the physical presence of both the material credit card and the credit card holder; companies providing credit card payment services rely on the physical presence of the material credit card when the transaction is executed. In e-commerce, these two prerequisites are presently not indispensable: in order to complete a purchase, the purchaser, per-se unknown, simply has to communicate electronically to the vendor the credit card number and expiration date.

The adoption of security coding mechanisms for encrypting the information to be transmitted over the Internet is not seen by the potential purchasers as a sufficient measure: clamorous cases of "hackers" who were able to crack even sophisticated security schemes have been reported. People expect more.

Several solutions have been proposed in the attempt to make electronic transactions over the Internet more secure.

In general, a class of known solutions addresses the problem of verification of the purchaser's identity, but not the problem of security of sensitive information transmitted over an open communication network such as the Internet. Some examples of this class of solutions are listed below.

U.S. Pat. No. 6,282,522 B1 discloses an Internet payment system in which consumer client terminals interface to smart-card readers.

U.S. Pat. No. 6,014,636 discloses a point-of-sale (POS) payment system. The customer can make a POS payment either by authorizing direct debit from his bank account or by authorizing a charge to his credit card account. The customer's debit and credit card account information is collected by swiping the customer's debit or credit card through a magnetic stripe reader at the customer's location at the moment of sale.

Both these systems require a new device (the smart card reader or the magnetic stripe reader) to be bought by the users and to be interfaced to the users' personal computers. Additionally, the system of U.S. '522 does not work with most of the existing credit cards, which are not smart cards. Moreover, the sensitive information, albeit encrypted, is again transmitted over the Internet, and is thus prone to be fraudulently intercepted and cracked for future, unauthorised use.

U.S. Pat. Nos. 5,987,140 and 5,757,917 disclose payment systems requiring a mediator entity other than the customer and the vendor, such as a payment gateway that validates the customer's identity and authorizes the transaction, or a manager of a database in which the customers and the vendors need to be registered in order to operate. This adds costs that have to be absorbed by the vendors.

Another class of known solutions addresses the problem of inherent insecurity of information transmitted over an open communication network.

For example, U.S. Pat. No. 5,778,173 discloses a mechanism for enabling secure electronic transactions on the open Internet. According to that mechanism, in response to a user's request to make a purchase, the vendor web server transmits a purchase order number to both the user over the world-wide web (WWW) and to a transaction server, isolated from the Internet, over a communication system isolated from the Internet. The user subsequently pays for the purchase by initiating a communication between the user computer and the transaction server over a communication system isolated from the WWW. The user provides the purchase order number to the transaction server and proceeds to complete the purchase by providing a credit card number. The transaction server then transmits the complete order to the vendor.

A major problem of the above-described mechanism is that, although no credit card number travels on the Internet, the transaction server does not verify the identity of the purchaser. A user who has fraudulently come in possession of a credit card number can place a valid order. Another problem is that two servers at the vendor's side are needed: one is the server connected to the WWW, and the other is the transaction server, needed to receive from the user the credit card number. In order to allow potential customers to exploit the service, the vendor has to provide a number of transaction servers disseminated worldwide.

Other systems that aim at solving the problem of insecurity of information transmitted over an open network are for example described in U.S. Pat. Nos. 6,199,165 and 6,252,869.

SUMMARY

In view of the state of the art discussed, it has been an object of the present invention to provide a method for making secure the on-line processing of electronic transactions of goods/services purchased in an e-commerce system.

In particular, it has been an object of the present invention to provide a method assuring at the same time the security of sensitive information to be communicated by a purchaser, and the purchaser's identity.

In brief, a method according to the present invention comprises providing at least one transaction-processing computer distinct from the vendor's computer.

Under the control of a purchaser's network access device, a connection to a vendor's computer is established over an open, and thus potentially non-secure, data communication network, such as the Internet. Non-security sensitive information is then transmitted to the vendor's computer, over the open data communication network; this information enables the vendor's computer to identify the purchaser in association with the transaction.

Under the control of the vendor's computer, non-security-sensitive transaction information including a transaction amount in a specified currency is transmitted to the purchaser's network access device.

Then, under the control of the purchaser's network access device, a connection to the transaction processing computer is established over a second, non-open (and thus secure) data communication network, such as a telephone network. The transaction information and security-sensitive information including the purchaser's personal identification information, for example entered personally by the purchaser through the purchaser's network access device, are then transmitted to the transaction-processing computer, over the non-open data communication network, for allowing the transaction-processing computer to ascertain the identity of the purchaser.

Under the control of the transaction processing computer, the purchaser is identified on the basis of the purchaser's personal identification information and the transaction amount is charged to the purchaser's account. A connection is then established to the vendor's computer over a third, non-open (and thus secure) data communication network such as a telephone network, and a transaction approval is communicated to the vendor's computer.

BRIEF DESCRIPTION OF THE DRAWINGS

The features and advantages of the present invention will be made apparent by the following detailed description of an embodiment thereof, provided merely by way of a non-limitative example, which will make reference to the attached drawings, wherein:

FIG. 7 is a schematic flowchart showing the operation of an e-vendor server computer during an on-line purchase of goods/services by an e-customer;

FIGS. 8A and 8B show in terms of a schematic flowchart a process payment routine carried out by the payment processing server computer for processing an on-line payment, and FIG. 9 schematically shows the exchange of information between the e-vendor server computer, the e-customer's network access device and the payment processing server computer during an on-line purchase and payment of goods/services.

DETAILED DESCRIPTION

Figure 1:
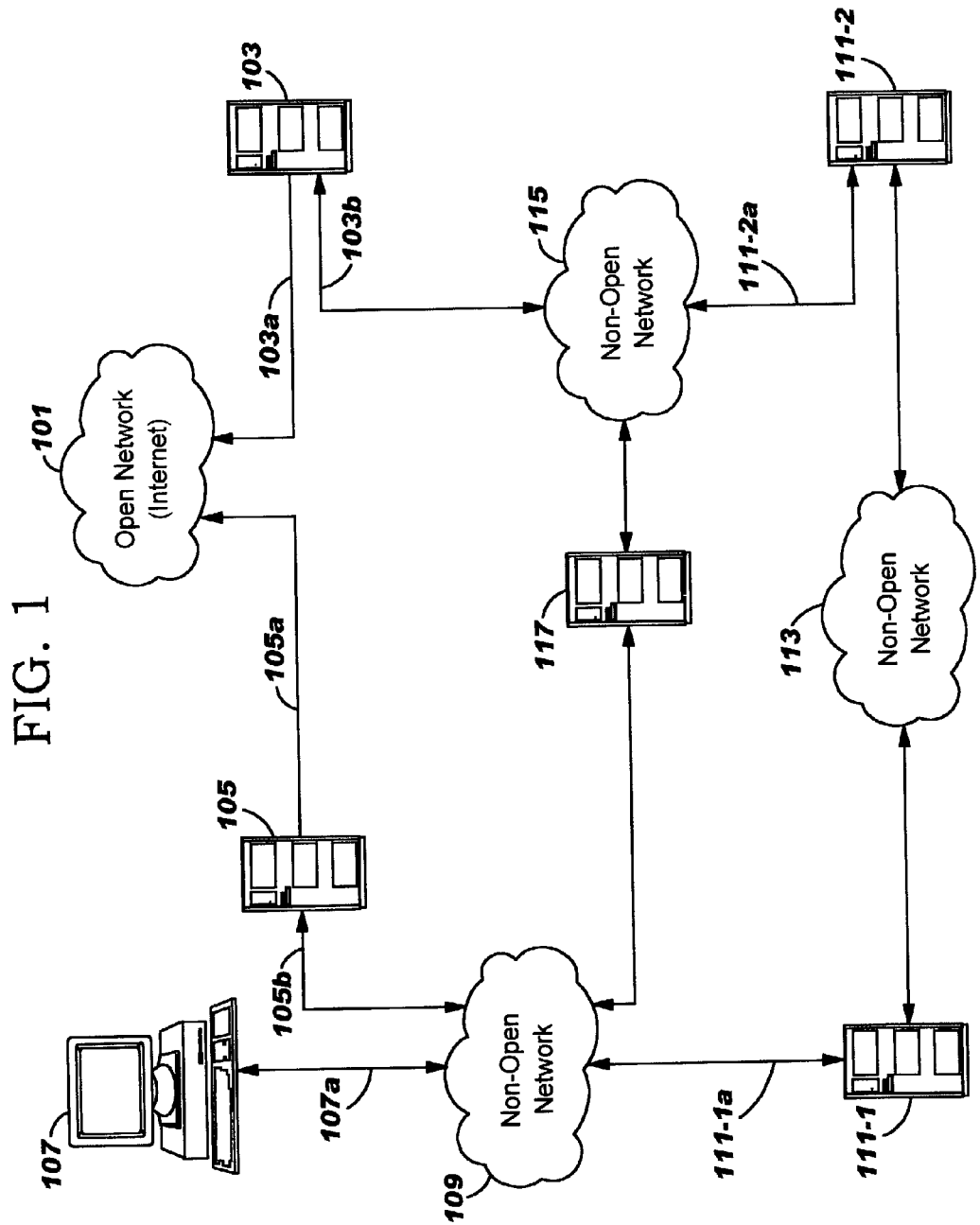
FIG. 1 schematically shows a system implementing a secure on-line payment method according to an embodiment of the present invention.

Referring to the drawings, FIG. 1 schematically shows a system for implementing a method according to an embodiment of the present invention for the secure on-line payment of goods/services purchased via an e-commerce system. The system comprises an open communication network 101, for example a packet data network such as the Internet, through which a plurality of server computers disseminated throughout the world are connected. The plurality of server computers connected through the open communication network 101 includes in particular e-vendor server computers, such as the e-vendor server computer 103, i.e. server computers supporting virtual sites, such as world-wide web (WWW) sites or websites, through which e-vendors offer goods and/or services for on-line sale. The plurality of server computers connected through the open communication network 101 also includes Internet access service provider (ISP) server computers, such as the ISP server computer 105. The ISP server computers primarily provide access services to the open communication network 101 to a plurality of subscriber user terminals or network access devices, in the following referred to as client computers, such as the client computer 107.

The server computers are connected to the open communication network 101 through high-speed data communication lines 103a, 105a, such as T1 digital communication links.

The client computers, such as the client computer 107, can establish a connection to respective local ISP server computers, such as the ISP server computer 105, through non-open communication networks, such as the non-open communication network 109. The non-open communication network 109 can be for example the public switched telephone network (PSTN), in particular a local exchange carrier (LEC) network, capable of connecting the client computer 107 and the local ISP server computer 105 through telephone connections 107a, 105b. Modems on both the client computer side and the ISP server computer side handle the transfer of data over the telephone connections 107a, 105b.

The system further includes a transaction or payment processing (PP) server computer system, comprising a plurality of PP server computers disseminated in different geographic areas and interconnected to each other through non-open communication networks. For example, as shown in the drawing, the PP server computer system includes a first PP server computer 111_1 local to the client computer 107, i.e. located in a same geographic region as the client computer 107, and a second PP server computer 111_2 local to the server computer 103, i.e. located in a same geographic region as the e-vendor server computer 103. The PP server computers 111_1 and 111_2 are connected to each other through a non-open communication network 113, such as the PSTN, in particular a LEC network, a frame relay network, an ATM, or a private communication network, in particular a LAN or a WAN. The first PP server computer 111_1 can be connected to the non-open communication network 109 through a telephone connection 111_1a. The second PP server computer 111b can be connected to the e-vendor server computer 103 through a non-open communication network 115, such as a local PSTN, in particular a LEC network, capable of connecting the e-vendor server computer 103 and the second PP server computer 111_2 through telephone connections 103b, 111_2a. The non-open communication networks 109 and 115 may be connected to each other through an interconnection exchange 117, in particular an interexchange carrier (IXC).

The system of PP server computers is managed by a company providing credit card payment services. Alternatively, the system of PP server computers is managed by a third-party company entrusted by a credit card company, where the third-party company is allowed to charge credit card holders' accounts. The system of PP server computers may also be connected to the open communication network 101, for example through a dedicated high-speed connection such as the links 103a, 105a, for providing on-line information and services, with the intention that no sensitive information ever travels on the open communication network 101 (as will be explained in the following).

The payment processing server computer system may reduce to a single payment processing server computer located anywhere in the world and connectable to both the client computers and the e-vendors' server computers through a non-open communication network. For example, the payment processing server computer system may include only the PP server computer 111_1, connectable to the client computer 107 through the non-open communication network 109 and to the e-vendor server computer 103 through the non-open network 109, the interconnection exchange 117 and the non-open network 115.

Additionally, the non-open communication networks 115 and 109 may be a same LEC network, and also the non-open communication network 113 connecting the different PP server computers can coincide with any one of the non-open communication networks 109, 115.

Figure 2A:
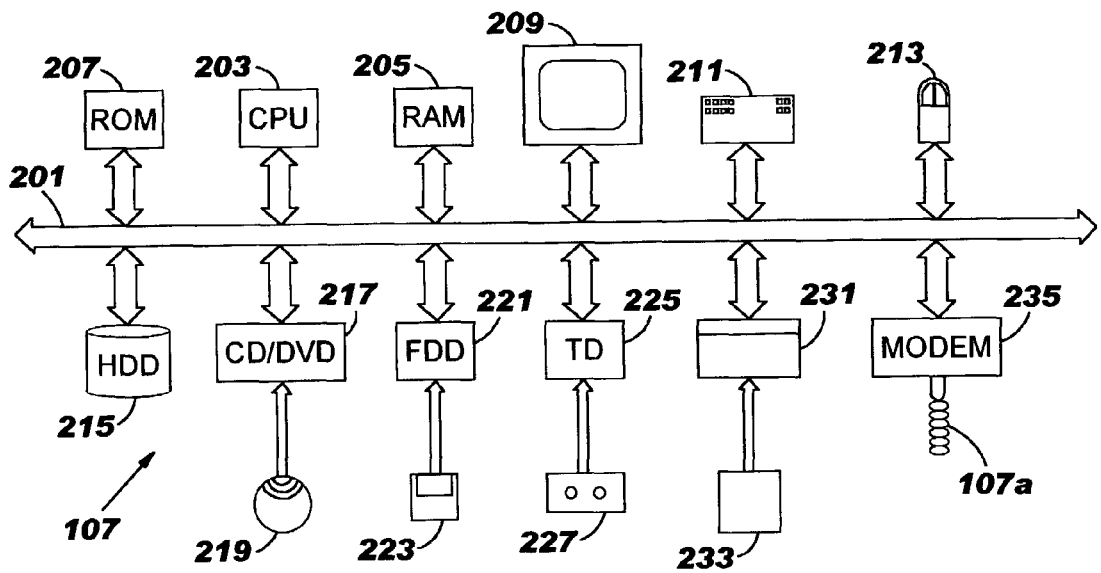
FIG. 2A shows an embodiment of an e-customer network access device, in terms of the main functional block.

FIG. 2A schematically shows a generic client computer 107 in terms of the main functional units. The client computer 107 typically consists of a Personal Computer (PC), formed by several units connected in parallel to a data communication bus 201, for example of the PCI or USB type. In particular, a central processing unit (CPU) 203, typically comprising a microprocessor, controls the operation of the client computer 107, a working memory 205, typically a RAM (Random Access Memory) is directly used by the CPU 203, and a Read Only Memory (ROM) 207 stores a basic program for the bootstrap of the client computer 107. The client computer 107 comprises several peripheral units, connected to the bus 201 by means of respective interfaces. Particularly, the peripheral units include peripheral units allowing the interaction with a user, such as a display device 209 (for example a CRT, LCD or plasma monitor), a keyboard 211 and a pointing device 213 (for example a mouse). Further peripheral units include a hard-disk driver (HDD) 215 driving a magnetic hard disk used for internal mass storage of programs and data, a CD-ROM/DVD driver 217 for reading CD-ROMs/DVDs 219, a floppy-disk driver 221 for reading/writing floppy disks 223 and, optionally, a tape driver (TD) 225 for reading/writing a cassette 227. The client computer 107 normally has one or more free connectors, available for connecting additional peripheral units to the bus 201. In the drawing, one such connector 229 is schematically shown, through which an additional peripheral unit 231 is connected to the bus 201. The additional peripheral unit 231 can be in particular a memory card reader, for reading/writing memory cards 233, for example MemoryStick cards, SmartMedia cards, Compact-Flash cards. Other additional peripheral units that can be connected to the bus 201 through available free connectors may include portable hard-disk drives, such as the commercially-available Archos MiniHD Portable Hard Drive, which can be interfaced to the bus 201 through USB, FireWire (IEEE-1394) or PC card interfaces, USB storage devices such as the commercially-available IBM USB memory key, smartcard reader units, for reading smartcards. Also connected to the bus 201 is a modem (MODEM) 235 used by the client computer 107 to communicate through the telephone connection 107a.

The e-vendor server computer 103 and the ISP server computer 105 are normally more powerful machines than the client computer 107, having for example more than one processing unit and more than one hard disk drive unit. The ISP server computer includes, among other peripheral units, one or more modems for the connection through telephone lines to the subscriber client computers. Also the e-vendor server computer 103 includes, among other peripheral units, one or more modems, for the connection through telephone lines to the PP server computers. Similar considerations apply to the server computers 111_1, 111_2 of the PP server computer system.

The operation of the secure on-line payment system will be now described.

Figure 2B:
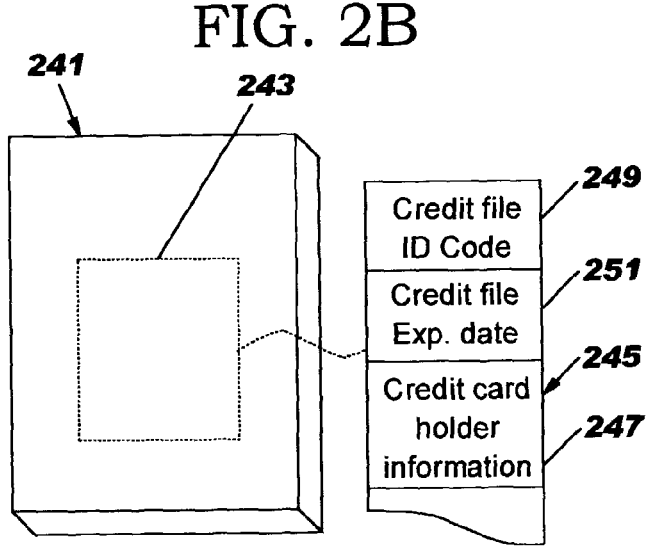
FIG. 2B schematically shows an e-customer's storage support storing an electronic credit certificate to be used for the on-line payment.

Preliminarily, the party managing the PP server computer system, for example the company providing credit card payment services (in the following simply referred to as credit-card company or CC company) issues to a credit card holder making an explicit request an electronic credit certificate, for example an electronic file, in the following referred to as a credit file, to be used for future on-line payments of goods/services purchased from e-vendors. As schematically shown in FIG. 2B, the credit card holder receives from the CC company a portable storage support 241, containing a storage medium 243 in which a credit file 245 is stored. The portable storage support 241 can be any storage support usable by the client computer 107, such as a floppy disk 223, a memory card 233, a USB memory key, a smartcard, or a portable hard-disk drive. The credit file 245 includes one or more fields 247 containing information, preferably encrypted, for identifying the credit card holder, for example the credit card number. In addition, the credit file 245 includes a field 249 containing a credit file identification (ID) code, which will be used for identifying the credit file. The credit file 245 may also include further fields, such as a field 251 containing a credit file expiration date. Alternatively, the credit file TD code and, where present, the credit file expiration date may be stored on the storage support 241 in a file or in files separate from the credit file 245. Alternatively, the credit file 245, instead of being issued to the credit card holder on the physical storage support 241, can be electronically transmitted from a CC company server computer, such as one of the server computers of the PP server computer system, for example the server computer 111_1, to the credit card holder's client computer 107 over a secure, non-open communication network, such as the telephone network 109. In this case, the credit card holder stores the credit file 245 on the respective hard disk drive 215 of the client computer 107; preferably, the received credit file 245 is stored on a portable storage support 241, such as a floppy disk, a memory card, a USB memory key, a smartcard, or a portable hard disk drive, so that the credit card holder can bring the credit file with him/her and is not restricted to using always the same client computer when performing on-line purchases.

Before being used for on-line payment, the credit file 245 has to be activated. A possible embodiment of a credit file activation procedure is schematically depicted in terms of simplified flowcharts in FIGS. 3 and 4. In particular, the flowchart of FIG. 3 shows the actions performed on the credit card holder's, or e-customer's client computer 107 side, while the flowchart of FIG. 4 shows the actions performed on the side of the PP server computer system, such as the PP server computer 111_1.

Figure 5:
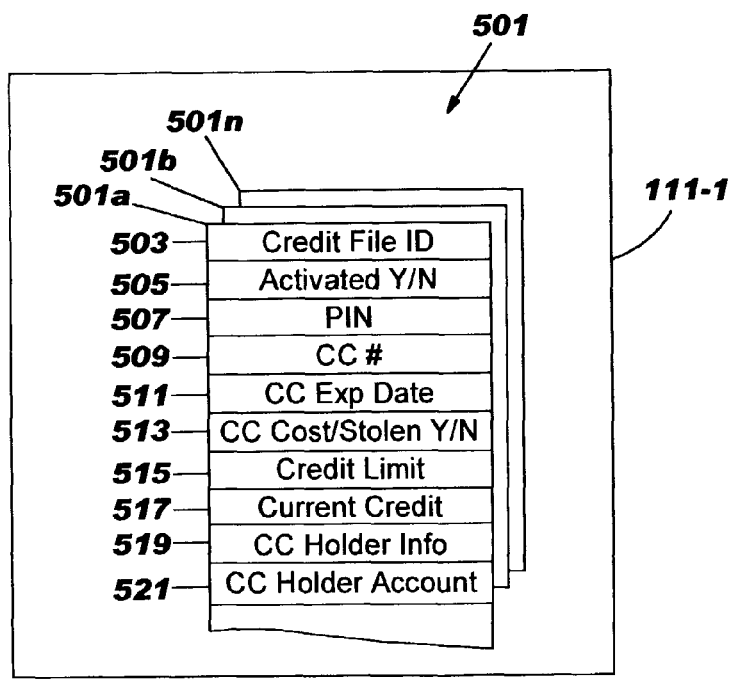
FIG. 5 schematically shows a database of e-customers managed by the payment processing server computer.
Figure 3:
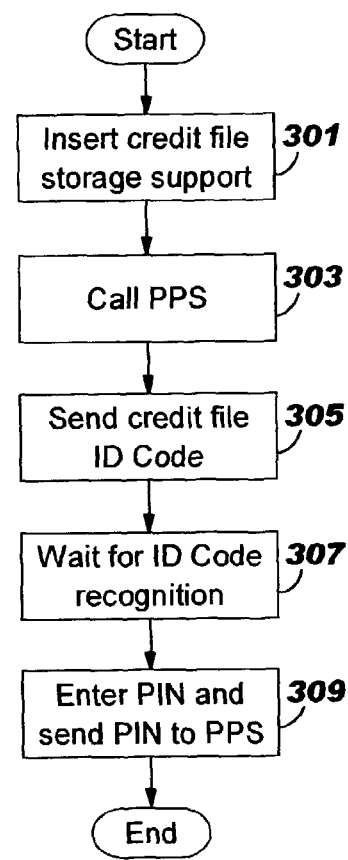
FIG. 3 is a flowchart schematically showing an operation of activation of an e-customer electronic credit certificate on the e-customer client computer side.
Figure 4:
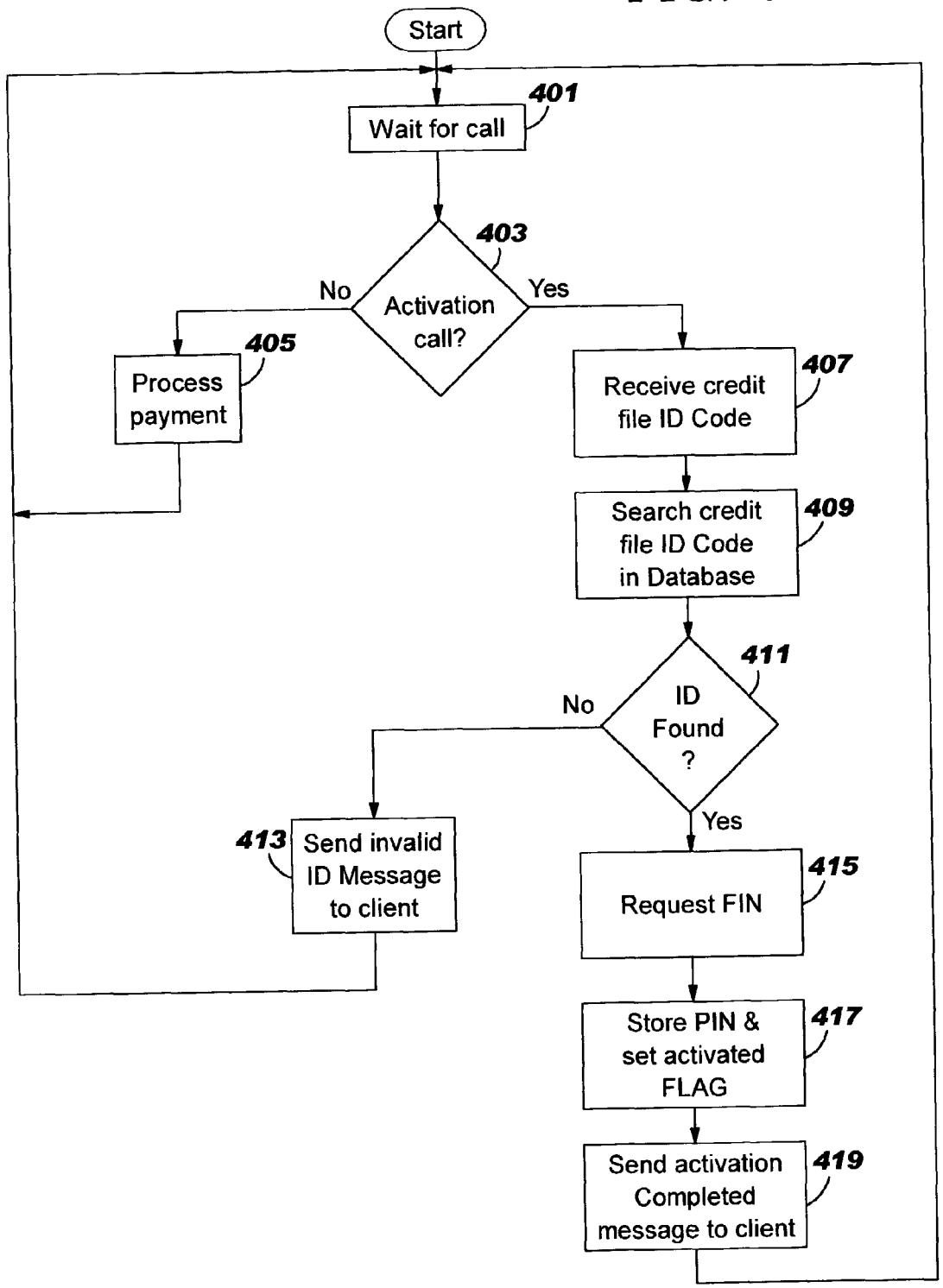
FIG. 4 is a flowchart schematically showing the operation of a payment processing server computer of the system of FIG. 1.

Referring first to FIG. 3, on the e-customer's client computer side, the e-customer inserts the storage support 241 on which the credit file 245 is stored in the appropriate read/write unit of his/her client computer 107 (block 301). Then, the e-customer's client computer 107 establishes, through the modem 235, a telephone connection with the local PP server computer 111_1 over the non-open communication network 109 (block 303) and sends the credit file ID code to the PP server computer 111_1 (block 305). The telephone connection with the local PP server computer 111_1 may be established by calling a toll-free number, so that the e-customer is not charged with the phone call costs. The e-customer's client computer 107 waits for the PP server computer 111_1 to recognize the transmitted credit file ID code (block 307). Once the credit file ID code has been recognized, the PP server computer 111_1 sends to the client computer 107 a request for a personal identification number (PIN). The request is displayed to the credit card holder on the display device 209: for example, a window pops up on the display device 209, with a box to be filled in by the e-customer. The e-customer enters the desired PIN through the keyboard 211, and the entered PIN is transmitted by the e-customer's client computer 107 to the PP server computer 111_1 (block 309). The credit file activation routine on the client computer side ends. On the PP server computer side (FIG. 4), the PP server computer 111_1 constantly waits for a phone call from an e-customer's client computer 107 (block 401) over the non-open communication network 109. Clearly, while waiting for a phone call from an e-customer's client computer, the PP server computer may perform other actions. When an incoming call is detected, the PP server computer 111_1 checks if the call is a call for activating an issued credit file or for processing an on-line payment (decision block 403). In the latter case, a process payment routine 405 (explained later on) is entered. If instead the incoming call is for activating a credit file, a credit file activation routine is entered. The credit file activation routine provides for receiving from the e-customer's client computer 107 the credit file ID code stored on the e-customer's storage support 241 (block 407). Once the credit file ID code has been received, the PP server computer 111_1 searches through a database of issued credit files (block 409), to find a matching credit file ID code. The database is schematically depicted in FIG. 5, wherein it is identified by 501. For each issued credit file the database comprises a record 501a, 501b, ..., 501n. Each record 501a, 501b, ..., 501n comprises a field 503 containing the credit file ID code, a field 505 containing a flag indicating whether the issued credit file has been activated or not, a field storing the PIN chosen by the e-customer, a field 509 containing the number of the credit card of the e-customer, a field 511 containing the credit card expiration date, a field 513 containing a flag indicating whether the credit card has been declared lost or stolen, a field 515 containing the credit limit set for the credit card for a prescribed period (typically, one month), a field 517 containing the current exploited credit for the current period (e.g. the current month), a field 519 containing information about the credit card holder, and a field 521 containing information adapted to identify the credit card holder account to be charged. The database may be kept by one of the PP server computers of the PP server computer system; alternatively, each PP server computer may have a resident copy of the database. Reverting to FIG. 4, if the credit file ID code received from the e-customer client computer 107 is not found in the database (decision block 411), the PP server computer 111_1 sends to the e-customer's client computer 107 a message informing that the ID is invalid (block 413), to be displayed to the e-customer; the credit file activation routine is aborted, and the PP server computer 111_1 jumps back to the wait-for-call idle state (block 401). If the PP server computer 111_1 finds a matching credit file ID code in the database, a request for entering the PIN is sent to the e-customer's client computer 107 (block 415). Once the PIN is received from the e-customer's client computer 107, the PIN is stored in the field 413 of the respective record 501a, 501b, ..., 501n of the database, and the flag in the field 405 is set so as to indicate that the credit file has been activated (block 417). The PP server computer 111_1 sends to the e-customer's client computer 107 a message informing that the credit file activation has been completed (block 419), to be displayed to the e-customer and the PP server computer 111_1 jumps back to the wait-for-call idle state (block 401).

Once the credit file has been activated, it can be used by the e-customer for performing on-line payments.

The PIN that the e-customer has to enter when activating the credit file and that is stored in the database kept by the PP server computer system can be a string of digits, or a string of characters, such as a pass-phrase, or an alphanumeric string of digits and characters, such as a pass-phrase with embedded a numeric code. For greater security, the PIN is assigned an expiration date: before processing an on-line payment, the PP server computer system checks whether the PIN is expired, and asks the e-customer to enter a new PIN, different from the expired one stored.

The process of on-line payment of electronically purchased goods/services will be now described with the aid of FIGS. 6, 7 and 8. Specifically, FIG. 6 is a simplified flowchart showing the actions performed on the e-customer's client computer side, FIG. 7 is a simplified flowchart of the actions performed on the e-vendor's server computer side, and FIG. 8 is a simplified flowchart showing the actions performed on the PP server computer side in the execution of the process payment routine 405 of FIG. 4.

Figure 6A:
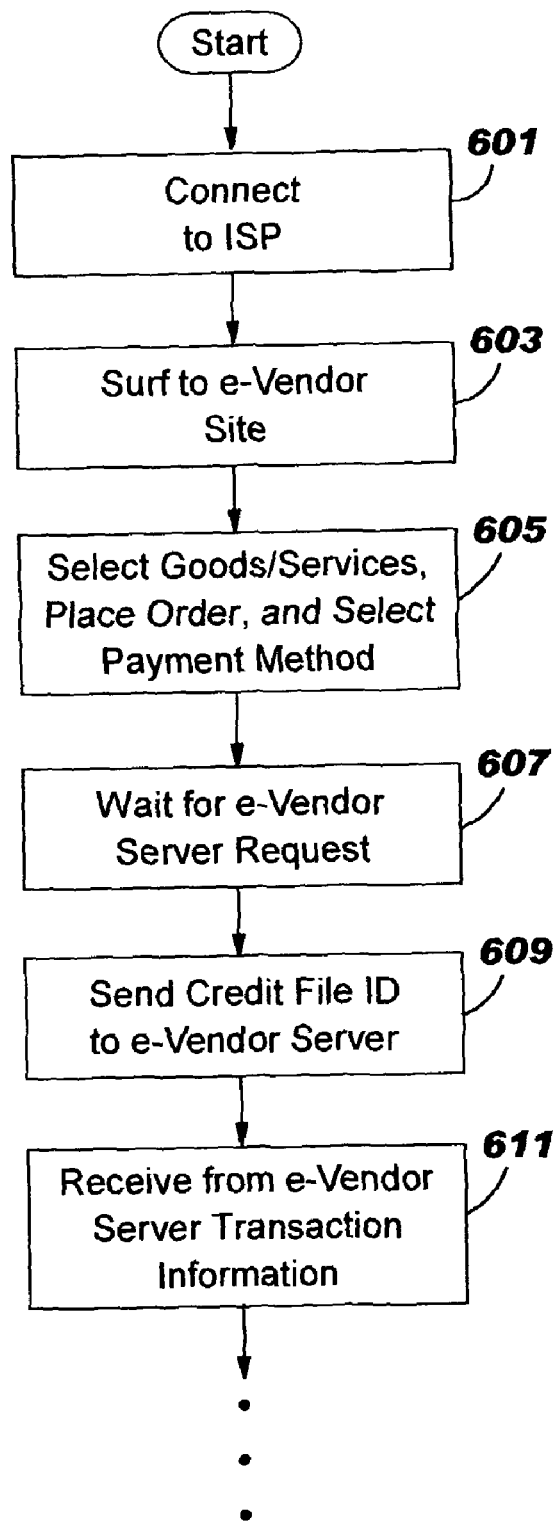
FIGS. 6A and 6B show in terms of a schematic flowchart the operation of the e-customer's network access device during an on-line purchase of goods/services from an e-vendor.
Figure 6B:
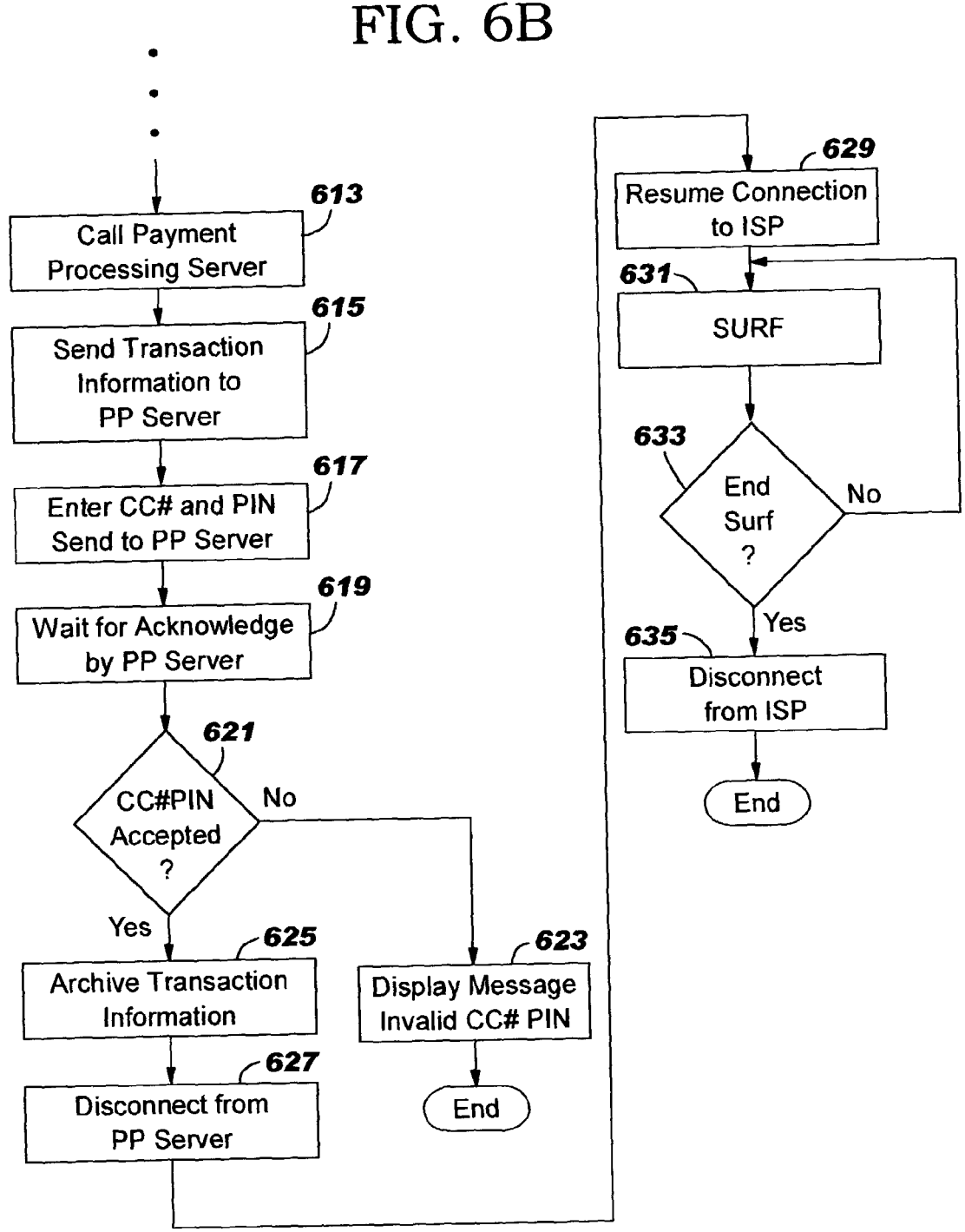

Referring first to FIGS. 6A and 6B, let it be assumed that an e-customer desires to purchase goods/services from an e-vendor. The e-customer's client computer 107 establishes a connection over the non-open communication network 109 to the local ISP server computer 105 in order to access the open communication network 101 (e.g., the Internet) to which the e-vendor server computer 103 is connected (block 601). By means of a client browsing software running on the client computer 107, the e-customer surfs the open communication network 101 to reach the virtual-shop site supported by the e-vendor's server computer 103 (block 603). Once the virtual-shop site is reached, the e-customer explores the site, selects the desired goods/services, places a purchase order for the selected goods/services and selects a method of payment (block 605). Typically, the e-customer places the order by filling one or more electronic forms downloaded by the e-customer's client computer 107 from the e-vendor's server computer 103 and visualized on the display device 209 of the e-customer's client computer 107, and the payment method is selected by checking a box in one of the above-referred forms. Let it be assumed that the e-customer selects the payment by credit card method. The e-customer's client computer 107 waits for a request from the e-vendor's server computer 103 (block 607). The client computer 107 then receives from the e-vendor's server computer 103 a request for the e-customer's credit file ID code. To satisfy the request, the e-customer has to insert in the appropriate read/write unit of his/her client computer 107 the credit file storage medium 241. The e-customer's client computer 107 reads the credit file ID code from the storage medium 241 and sends it to the e-vendor server computer 103, over the open communication network 101 (block 609). The e-customer's client computer 107 then receives from the e-vendor's server computer 103 information identifying the transaction, or transaction information (block 611). As schematically shown in FIG. 9, the transaction information 901 transmitted by the e-vendor's server computer 103 includes an e-vendor identifying code or number 903, a transaction identifying code or number 905, the amount of money, in a specified currency, involved in the transaction or transaction amount 907 and the transaction time and date 909. The transaction information, which does not contain security-sensitive information, is transmitted to the e-customer's client computer 107 over the open communication network 101, and it is stored on the client computer's side, for example on the credit file storage medium 241. The transaction information can be transmitted to the e-customer's client computer 107 in the form of a "cookie" file.

At this point, the e-vendor has a still unpaid purchase order.

The e-customer's client computer 107 then establishes a connection to the local PP server computer 111_1 through the non-open communication network 109 (block 613). To this purpose, the client computer 107 disconnects from the ISP server computer 105 to free the e-customer's telephone line, then dials the phone number of the credit card company payment processing server system (the number to be dialled, for example a toll-free number, is preferably stored in the client computer 107, and the connection routine is launched automatically by the client computer 107) and connects to the local PP server computer 111_1. Should the connection to the ISP server computer 105 be a connection that does not keep the e-customer's telephone line busy, as in the case of an asymmetric digital subscriber line (ADSL) connection, or should the e-customer have more than one telephone line available, as in the case of an integrated service digital network (ISDN) telephone line, the connection with the ISP server computer needs not to be interrupted and can be kept active.

Once the connection to the PP server computer 111_1 has been established, the e-customer's client computer 107 sends to the PP server computer 111_1 the transaction information received from the e-vendor's server computer 103, for example stored on the credit file storage medium 241 (block 615). The e-customer's client computer 107 then waits for the request by the PP server computer 111_1 to enter the e-customer's credit card number and the PIN. When the request is received, a window pops up on the display device 209 of the e-customer's client computer 107, showing the transaction information with a box for entering the credit card number and one for entering the PIN by the e-customer. The e-customer must at this point enter the credit card number and the PIN. Alternatively, the credit card number is not entered by the e-customer, being instead automatically read from the credit file. The credit card number and the PIN are then transmitted to the PP server computer 111_1 (block 617). Preferably, the credit card number and the PIN are transmitted to the PP server computer in an encrypted form; an irreversible hashing algorithm such as the MD5 is used. Alternatively, the e-customer's client computer 107 does not wait for the PP server computer 111_1 to request the e-customer's credit card number and PIN: before transmitting the transaction information, the window with the transaction information and the boxes for entering the credit card number and the PIN pops up on the display device 209, the e-customer enters the credit card number and the PIN, then the credit card number and the PIN are encrypted and are transmitted, together with the transaction information, to the PP server computer 111_1. As schematically shown in FIG. 9, all these data (identified altogether as 911 in the drawing) including security-sensitive information are transmitted from the client computer 107 to the local PP server computer 111_1 over the non-open communication network 109, to guarantee security of the transmitted data. The software necessary to the e-customer's client computer 107 for performing these actions can be for example supplied to the e-customer by the company managing the payment processing server computer system, together with the credit file; the software can be stored on the credit file storage support, so as to be portable by the user.

The e-customer's client computer 107 then waits for a message from the PP server computer 111_1 confirming the validity of the entered credit card number and PIN (block 619). When the acknowledge message is received, the e-customer's client computer 107 verifies (block 621) whether the entered credit card number and PIN have been accepted as valid or not by the PP server computer 111_1. In the case where the credit card number or the PIN have not been recognized as valid by the PP server computer 111_1, a window pops up on the display device 209 informing the e-customer that the entered credit card number or PIN are invalid (block 623) and the process ends. Preferably, a limited number of retrials are allowed to the e-customer before ending the process. When the entered credit card number and PIN have been recognized as valid by the PP server computer 111_1, the client computer 107 archives (block 625) the transaction information, having for example the form of a cookie, as previously mentioned, for possible later inquiries: the credit cookie is erased from the credit file storage medium 241 and is saved on a mass-storage unit of the e-customer's client computer 107 such as the hard disk.

The e-customer's client computer 107 then disconnects from the PP server computer 111_1 (block 627), and resumes the connection to the ISP server computer 105 (block 629) (clearly, if the connection to the ISP server computer had not been previously interrupted, the connection needs not to be resumed) to go on surfing on the open communication network 101 (block 631). Once the e-customer has finished the surfing (decision block 633), the e-customer's client computer 107 disconnects from ISP server computer 105 (block 635).

Referring now to FIG. 7, on the e-vendor's server computer side, the e-vendor's server computer 103 constantly waits for a purchase order to be placed (block 701); while waiting for a purchase order to be placed, the e-vendor's server computer 103 can clearly perform other actions, such as sending to the e-customer's client computer 107 hypertext pages, or serving requests from other e-customers. Once the e-customer has selected the desired goods/services and wants to place a purchase order selecting as the method of payment the payment by credit card (preferably, the e-vendor's server computer implements a secure web transaction system or SWTS), the e-vendor's server computer 103 requests the e-customer's credit file ID (block 703). The e-vendor's server computer 103 then receives the credit file ID (block 705) from the e-customer's client computer 107.

By sending the credit file ID code to the e-vendor's server computer 103, the e-customer enables the e-vendor to ascertain that the e-customer is in possession of an electronic credit certificate, and is thus allowed to perform this kind of transaction.

Once the credit file ID has been received, the e-vendor's server computer 103 sends to the e-customer's client computer 107 the transaction information, for example in the form of a cookie (block 707). The e-vendor's server computer 103 then waits for the transaction settlement or approval by the PP server computer system (block 709). While waiting for the transaction approval, the e-vendor's server computer 103 can clearly perform other actions, such as serving other e-customers and accepting new purchase orders. The e-vendor's server computer 103 then receives the call from the PP server computer system, communicating the approval or the rejection of the transaction (block 711). The e-vendor's server computer 103 checks whether the payment of the transaction amount has been approved, and the corresponding amount of money charged on the e-customer's account, or the payment has been rejected (block 713). In the former case, the purchase order processing is completed, and the selected goods/services delivered to the e-customer (block 715). If the payment of the transaction amount has been rejected, the purchase order is cancelled (block 717). While a transaction is awaiting approval or rejection, the e-vendor's server computer 103 keeps it in a batch, and the e-vendor's server computer 103 waits for the transaction approval or rejection to be received from the PP server computer system. Optionally, transactions not yet approved are removed from the batch and cancelled if the approval/rejection from the PP server computer system is not received within a prescribed time from the transaction date.

Figure 8A:
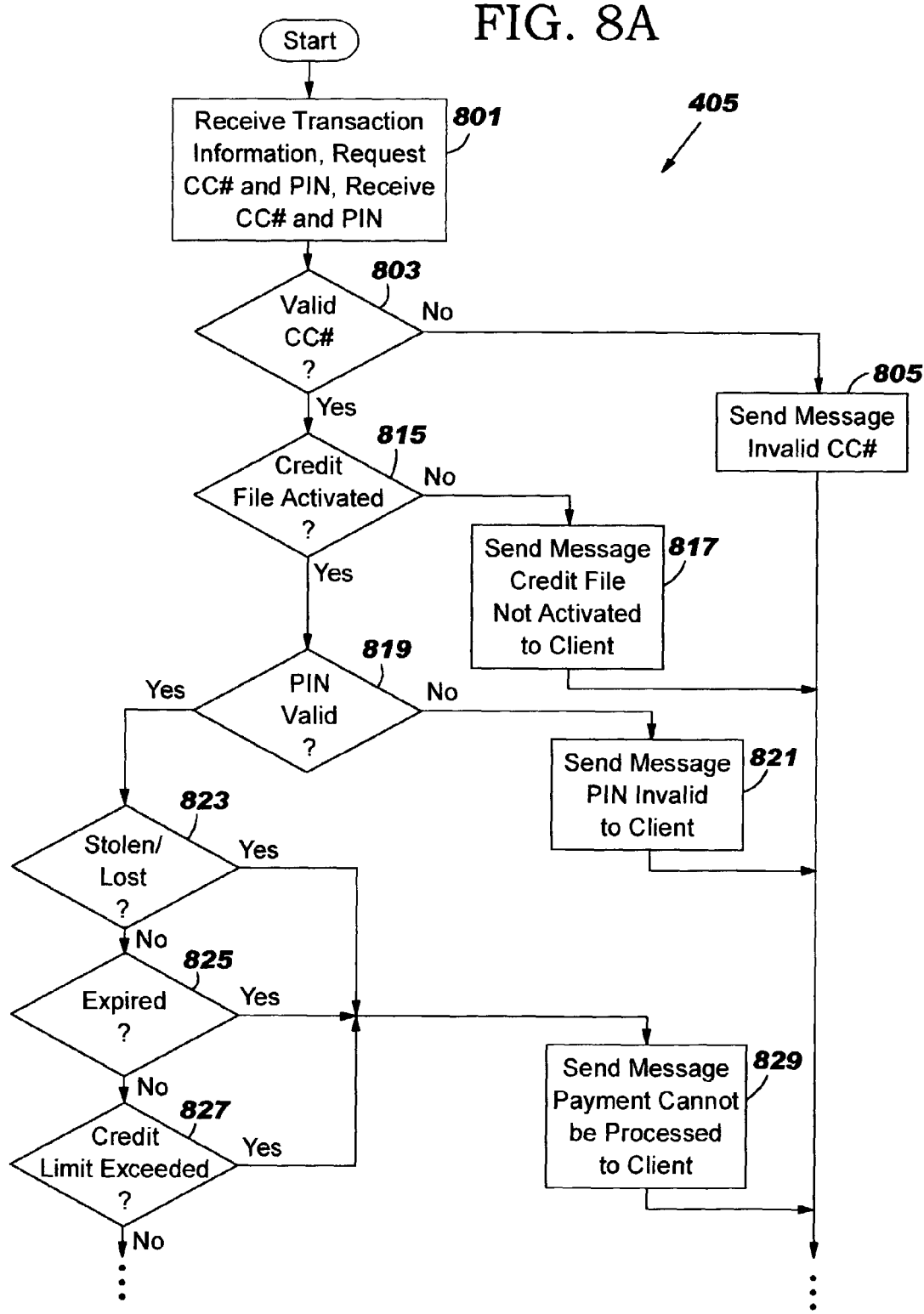

Making now reference to FIGS. 8A and 8B, the payment processing routine 405 on the PP server computer 111_1 side provides for receiving from the e-customer's client computer 107 the transaction information (block 801). The PP server computer 111_1 then sends to the e-customer's client computer 107 a request for entering the e-customer's credit card number and PIN, and receives the credit card number and PIN entered by the e-customer (block 801). By looking at the database (the field 509 of the records 501a, 501b, ..., 501n), the PP server computer 111_1 verifies if the received credit card number is valid (block 803). In the negative case, a message is sent to the e-customer's client computer 107 (to be visualised on the display device 209) informing that the entered credit card number is invalid (block 805), and the connection to the e-customer's client computer 107 is broken (block 807). Preferably, before disconnecting from the e-customer's client computer 107, the PP server computer 111_1 allows to the e-customer a limited number of retrials, to overcome typing errors. If after the allowed retrials a valid credit card number is not received, the PP server computer 111_1 disconnects from the e-customer's client computer 107 (block 807) and connects to the e-vendor's server computer 103 (block 809) to send a message informing that the payment for the transaction identified by transaction number and date has been rejected (block 811). The PP server computer 111_1 then disconnects from the e-vendor's server computer 103 (block 813). If the received credit card number is found valid, the PP server computer 111_1 looks at the database (the field 505 of the records 501a, 501b, ..., 501n corresponding to the received credit file ID), to verify that the received credit card number corresponds to an activated credit file (block 815). In the negative case, the PP server computer 111_1 sends to the e-customer's client computer 107 a message (to be displayed on the display device 209) informing that the credit file has not yet been activated (block 817). The PP server computer 111_1 then disconnects from the e-customer's client computer 107 (block 807) and informs the e-vendor that the transaction has been rejected (blocks 809, 811 and 813). Alternatively, the PP server computer 111_1 may enter the credit file activation process, so as to allow the e-customer to activate his/her credit file before proceeding with the payment processing.

If the received credit card number corresponds to an activated credit file, the PP server computer 111_1 verifies the identity of the e-customer. To this purpose, the PP server computer 111_1 uses the received PIN entered by the e-customer. The PP server computer 111_1 then checks if the received PIN corresponds to the one stored in the field 507 of the respective record in the database (block 819). In the negative case, the PP server computer 111_1 sends to the e-customer's client computer 107 a message informing that the entered PIN is invalid (block 821). Then, the PP server computer 111_1 disconnects from the e-customer's client computer 107 (block 807) and informs the e-vendor that the transaction has been rejected (blocks 809, 811 and 813). Preferably, before disconnecting from the e-customer's client computer 107, a limited number of retrials are allowed to the e-customer for entering a valid PIN.

If the received PIN is found valid, the PP server computer 111_1 looks at the database to check if the credit card of the e-customer has been declared stolen or lost (block 823) or if the credit card is expired (block 825) or if the current credit (field 517) plus the current transaction amount received from the e-customer client computer exceeds the credit limit, stored in the field 515 in the database (block 827). If any one of the above checks gives a positive result, the PP server computer 111_1 sends to the e-customer's client computer 107 a message informing that the payment cannot be processed (block 829). Then, the PP server computer 111_1 disconnects from the e-customer's client computer 107 (block 807) and connects to the e-vendor's server computer 103 (block 809) to send a message informing that the payment for the transaction identified by transaction number and date has been rejected (block 811). Then, the connection to the e-vendor's server computer 103 is broken (block 813). If, on the other hand, the credit card of the e-customer is not lost or stolen or expired, and if there is sufficient credit left, the PP server computer 111_1 charges the transaction amount on the e-customer's account (block 831). Then the PP server computer 111_1 disconnects from the e-customer's client computer 107 (block 833) and connects to the e-vendor's server computer 103 (block 835) to send thereto information relating to the successfully processed payment of the transaction (block 837). Then, the PP server computer 111_1 disconnects from the e-vendor server computer 103 (block 839).

The connection to the e-vendor's server computer 103 is over a non-open communication network which may include the non-open communication network 113 putting the PP server computer 111_1, local to the e-customer client computer 107, in communication with the PP server computer 111_2, local to the e-vendor server computer 103, and the non-open communication network 115; alternatively, the PP server computer 111_1 may connect to the e-vendor server computer 103 through the non-open communication network 109, the interexchange carrier 117 and the non-open communication network 115.

The information transmitted by the PP server computer 111_1 to the e-vendor's server computer 103, as schematically shown in FIG. 9 wherein they are indicated by 913, includes the e-vendor number, the transaction number, the transaction amount and currency, the transaction date and time, an indication 915 of whether the transaction has been approved or rejected, a transaction approval code 917, assigned by the PP server computer system to the approved transaction, and the e-customer's credit card number.

Alternatively, the PP server computer 111_1 sends to the e-vendor's server computer 103 the credit file ID code, instead of the e-customer's credit card number. In this way, it is assured that the e-vendor does not have possession of the e-customer's credit card number. This prevents possible frauds perpetrated by "phantom" e-vendors.

It can be appreciated from the foregoing description that the on-line payment method according to the present invention ensures a high degree of security.

First of all, security-sensitive information necessary to process the payment of the on-line purchase never travels on the open communication network (e.g. the Internet), but over a more secure, non-open communication network such as the public switched telephone network. In particular, the credit card number never travels on the open communication network, and the e-customers are never required to enter it on the open network: in this way, the credit card number cannot be fraudulently intercepted for future, unauthorised use on non-secure e-commerce sites. This will make the potential users of e-commerce systems less reluctant.

Secondly, the presence of the credit card holder is guaranteed, just as in any non-on-line transaction regulated by credit card. In fact, the personal electronic credit certificate, issued by the credit card company, plays the role of the material credit card, and must be present in order to process a transaction. Additionally, before processing the transaction, the identity of the credit card holder is ascertained through the personally-entered PIN: this identity check corresponds to the check carried out by shop personnel (by comparing the credit card holder signature on the credit card to the signature of the customer on the payment receipt, or by asking the customer to show an identity card) in a non-on-line transaction. People will not be worried by entering personal identification codes, since they are already familiar with this procedure, being similar to that followed when using debit cards in automated teller machines (ATM) or in POS terminals.

An advantage of the on-line payment method according to the present invention is that it can rely on the well-known, widespread credit card payment system, to which people are already accustomed. No new, unusual credit or payment systems are involved, such as electronic money systems, electronic wallet systems, or mobile phone payment systems, which the majority of people still find burdensome.

It is expected that credit card companies will welcome the on-line payment method and system according to the present invention. Consumers who are presently reluctant to use their credit cards in on-line purchases, and thus abstain from this form of commerce or adopt different payment methods such as bank drafts or checks, will be attracted by the inherent security offered by the method according to the present invention, and will accept the use of credit card also for e-commerce transactions.

On the other hand, also credit card companies will feel more protected against fraudulent use of credit cards. By adopting the method according to the present invention, the presence of the true credit card holder is guaranteed by the presence of the credit file on the side of the e-customer's client computer, and by the fact that the e-customer must enter a PIN.

Another advantage of the on-line payment method according to the present invention is the fact that it does not necessarily involve the existence of a third-party company distinct from the credit card company: the company managing the payment processing server system may in fact be the credit card company itself.

Additionally, any credit card holder and any merchant already offering the possibility of credit card payment can operate through the system according to the present invention, no additional registration being required.

Although the present invention has been disclosed and described by way of an embodiment thereof, it will be apparent to those skilled in the art that several modifications to the described embodiments, as well as other embodiments of the present invention are possible without departing from the scope thereof as defined in the appended claims.

For example, although in the preceding description reference has been made to the Internet, the method and system according to the present invention will find application in general whenever transmission of sensitive information over a non-secure, open communication network is involved.

As another example, the client computer 107 can be either a desktop personal computer or a portable personal computer or a palmtop computer. In general, any device allowing the purchaser access to and surf the open data communication network 101 and capable of establishing a secure connection to the payment processing server computer system over the non-open data communication network 109 is suitable, such as a mobile phone supporting browsing software, such as a WAP, GPRS or UMTS mobile phone.

In another possible alternative, the PIN is not entered every time by the e-purchaser once the connection to the PP server computer is established. Rather, the PIN may be stored in the credit file during the credit file activation process, and be automatically retrieved from the credit file for being transmitted to the PP server computer. In this case, it is intended that the ID is never read from the credit file during the session on the open data communication network.

We claim:

1. A method for on-line processing of electronic commercial transactions between a purchaser's network access device and a vendor's computer connectable over a first, open data communication network, the method comprising:

providing a transaction-processing computer system, wherein providing the transaction-processing computer comprises providing a plurality of transaction-processing server computers disseminated in different geographic areas, and interconnecting the plurality of transaction-processing server computers to each other through at least one non-open communication network;

providing the vendor's computer;

providing a dedicated high-speed connection connecting the transaction-processing computer system to the open data communication network such that no sensitive information ever travels on the open data communication network;

under the control of the purchaser's network access device, establishing a first, uninterrupted connection to the vendor's computer over the open data communication network, wherein the purchaser's network access device is a mobile phone supporting browsing software;

under the control of the purchaser's network access device, transmitting to the vendor's computer, over the open data communication network, non-security-sensitive identifying information allowing the vendor's computer to identify the purchaser as enabled to perform the transaction;

under the control of the vendor's computer, transmitting to the purchaser's network access device non-security-sensitive transaction information including a transaction amount;

under the control of the purchaser's network access device, establishing a second connection to the transaction processing computer system over a second, non-open data communication network, wherein the transaction processing computer is managed by a third party company entrusted by a credit card company, the third party company being allowed to charge a credit card account of the purchaser, and transmitting to the transaction-processing computer system, over the non-open data communication network, the transaction information and security-sensitive information, including a purchaser's personal identification information for allowing the transaction-processing computer system to ascertain the identity of the purchaser, wherein the second connection is maintained simultaneously with the first connection; and under the control of the transaction processing computer system, identifying the purchaser by using the purchaser's personal identification information, charging the transaction amount on a purchaser's account, establishing a connection to the vendor's computer over a third, non-open data communication network, and communicating to the vendor's computer a transaction approval, wherein the third, non-open data communication network is selected from the group consisting of a non-open frame relay network, a non-open ATM network, and a private data communication network; and prior to conducting commercial transactions, issuing an electronic credit certificate to the purchaser, the electronic credit certificate being stored on a portable storage support, and activating the electronic credit certificate, the electronic credit certificate having a plurality of fields, the plurality of fields including at least a first field containing encrypted information for identifying the purchaser, a second field containing a credit certificate identification (ID) code for identifying the credit certificate, and a third field for containing an expiration date of the credit certificate, the activating including:
  inserting the portable storage support into a read/write unit of the purchaser's network access device;
  establishing a connection over the non-open communication network and using the connection over the non-open communication network,
    sending the credit certificate ID code to the transaction-processing computer system;
    receiving a request from the transaction-processing computer system for a personal identification number (PIN), the PIN being subject to an expiration date;
    displaying the request for a PIN on the purchaser's network access device;
    transmitting the purchaser-entered PIN to the transaction-processing computer system;
    in a case that the purchaser-entered PIN is valid, activating the credit certificate; and
    displaying a message on the purchaser's network access device indicating notifying the purchaser of the activation; and
  wherein the portable storage support is selected from the group consisting of a floppy disk, a memory card, a USB memory key, and a portable hard-disk drive, and
  wherein the portable storage support includes the non-security-sensitive identifying information, the purchaser's network access device retrieving from the electronic credit certificate the non-security-sensitive information to be transmitted to the vendor's computer.

2. The method according to claim 1, in which the first, open data communication network is a packet data network.

3. The method according to claim 1, in which the second, non-open data communication network is a telephone network.

4. The method according to claim 1, in which the third, non-open data communication network includes the second, non-open data communication network.

5. The method according to claim 1, wherein said security-sensitive information includes a purchaser's credit card number.

6. The method according to claim 1, wherein the step of charging the transaction amount on a purchaser's account includes:
  under the control of the transaction processing server, identifying a purchaser's credit card number, and charging the transaction amount on the purchaser's credit card.

7. The method according to claim 1, wherein the step of establishing the first connection by the purchaser's network access device to the vendor's computer over the open data communication network includes:
  under the control of the purchaser's network access device, establishing a connection that does not keep the purchaser's telephone line busy to an access service provider computer connected to the open data communication network and providing access services to the open data communication network.

8. The method according to claim 1, wherein the transaction processing computer system is managed by a credit card company.

9. The method according to claim 1, wherein the purchaser's personal identification information is entered personally by the purchaser through the purchaser's network access device.

10. A system for on-line processing of commercial transactions, comprising:
  a purchaser's network access device uninterruptedly connectable to a first, open data communication network;
  a vendor's computer connected to the open data communication network; and
  a transaction processing computer system distinct from the vendor's computer, the transaction processing computer system comprising a plurality of transaction-processing server computers disseminated in different geographic areas, the plurality of transaction-processing server computers being interconnected to each other through at least one non-open communication network,
    the transaction processing computer system further being simultaneously connectable to the purchaser's network access device and to the vendor's computer over a dedicated high-speed connection such that no sensitive information ever travels on the open data communication network distinct from, and simultaneous with, the first, open data communication network,
    the transaction processing computer system further being managed by a third party company entrusted by a credit card company, where the third party company is allowed to charge a credit card account of the purchaser,
  wherein the purchaser's network access device is a mobile phone supporting browsing software, the mobile phone further comprising:
    a storage medium for storing non-security-sensitive transaction information, including a transaction amount, received from the vendor's computer over the open data communication network,
    a keyboard for allowing the purchaser to enter a personal identification information,
    a device for establishing a secure connection to the transaction processing computer system over the secure data communication network for communicating to the transaction processing computer system the transaction information and the personal identification information, wherein the secure connection to the transaction processing computer system is maintained simultaneously with the connection over the first, open data communication network; and the transaction processing computer system further ascertaining an identity of the purchaser based on the personal identification information received from the purchaser's network access device, for charging the transaction amount on a purchaser's account, and for communicating to the vendor's computer a transaction approval over the secure data communication network, wherein the secure data communication network is selected from the group consisting of a non-open frame relay network, a non-open ATM network, and a private data communication network; and wherein the system for on-line processing of computer transactions further comprises an electronic credit certificate issued to the purchaser for activation and use by the purchaser's network access device, wherein the electronic credit certificate is stored on a portable storage support readable by the purchaser's network access device, and the portable storage support is selected from the group consisting of a floppy disk, a memory card, a USB memory key, and a portable hard-disk drive, the electronic credit certificate including a plurality of fields, the plurality of fields including at least a first field containing encrypted information for identifying the purchaser, a second field containing a credit certificate identification (ID) code for identifying the credit certificate, and a third field for containing an expiration date of the credit certificate, the electronic credit certificate file further requiring activation prior to use, the activation including:

insertion of the storage support into a read/write unit of the purchaser's network access device;

establishment a connection over the non-open communication network and using the connection over the non-open communication network, sending the credit certificate ID code to the transaction-processing computer system;

receipt of a request from the transaction-processing computer system for a personal identification number (PIN), the PIN being subject to an expiration date;

display of the request for a PIN on the purchaser's network access device;

transmittal of the purchaser-entered PIN to the transaction-processing computer system;

in a case that the purchaser-entered PIN is valid, activation of the credit certificate; and display of a message on the purchaser's network access device indicating notifying the purchaser of the activation; and the electronic credit certificate includes non-security-sensitive credit certificate identifying information to be transmitted by the purchaser's network access device to the vendor's computer over the open data communication network, said credit certificate identifying information being used by the vendor's computer to ascertain that the purchaser is enabled to perform the transaction.

11. The system according to claim 10, in which the open data communication network is a packet data network.

12. A transaction processing computer system for the use in the system according to claim 10, comprising at least one transaction processing computer connectable through at least one secure data communication network to a network access device, operated by a purchaser, and a vendor's computer, the transaction processing computer receiving from the purchaser's network access device, over the secure data communication network, transaction information including a transaction amount and purchaser's personal identification information identifying the purchaser based on the personal identification information, charging the transaction amount on a purchaser's account and communicating to the vendor's computer, over the secure data communication network, a transaction approval.

13. An electronic credit certificate for the use in the system according to claim 10, the electronic credit certificate including non-security-sensitive credit certificate identifying information to be transmitted by a purchaser's network access device to a vendor's computer over an open data communication network, said credit certificate identifying information being used by the vendor's computer to ascertain that the purchaser is enabled to perform an on-line transaction.

14. A storage support storing the electronic credit certificate of claim 13.

* * * * *